(12) United States Patent
Richards et al.

(10) Patent No.: US 6,244,463 B1
(45) Date of Patent: Jun. 12, 2001

(54) CANDY DISPENSER WITH SINGLE-USER-ACTION DISPENSING MECHANISM

(75) Inventors: David Richards, Vallejo, CA (US); Marc Zak, Chagrin Falls, OH (US); Syed Hasan, San Ramone; Jeff Anis, Vacaville, both of CA (US); Ronald C. Boyle, Amelia, OH (US)

(73) Assignee: Oddzon, Inc., Pawtucket, RI (US)

( * ) Notice: Subject to any disclaimer, the term of this patent is extended or adjusted under 35 U.S.C. 154(b) by 0 days.

(21) Appl. No.: 09/457,567

(22) Filed: Dec. 9, 1999

(51) Int. Cl.[7] .................................................. A24F 15/04
(52) U.S. Cl. ........................... 221/24; 221/269; 221/270; 221/271; 221/274
(58) Field of Search ............................. 221/24, 185, 246, 221/269, 270, 271, 274, 276; 446/73, 230, 231

(56) References Cited

U.S. PATENT DOCUMENTS

| Re. 32,973 | 7/1989 | Panzarella . |
|---|---|---|
| 660,485 | 10/1900 | Bradshaw . |
| 1,031,764 | 7/1912 | Wright . |
| 1,632,414 | * 6/1927 | Nosan ............................. 221/271 X |
| 2,426,895 | 9/1947 | Neumann . |
| 2,547,825 | 4/1951 | King . |
| 2,579,714 | 12/1951 | Treuthart . |
| 2,631,578 | 3/1953 | Laughlin . |
| 2,675,641 | 4/1954 | Baggott . |
| 2,736,988 | 3/1956 | Fisher . |
| 2,862,320 | 12/1958 | Mayo . |
| 2,921,573 | 1/1960 | Horowitz et al. . |
| 2,974,438 | 3/1961 | Hopkins . |
| 2,987,847 | 6/1961 | Jones . |
| 3,010,718 | 11/1961 | Pearson, Jr. . |
| 3,093,925 | 6/1963 | Greene . |
| 3,100,947 | 8/1963 | Hellman . |
| 3,123,936 | 3/1964 | Feltman . |
| 3,162,322 | * 12/1964 | Gilbertson ........................ 221/270 X |
| 3,370,746 | * 2/1968 | Haas ....................... 221/24 |
| 3,389,492 | 6/1968 | Sullivan et al. . |
| 3,405,841 | * 10/1968 | Barr, Sr. et al. ................ 221/274 X |
| 3,660,930 | 5/1972 | Indjian . |
| 3,745,693 | 7/1973 | La Fata et al. . |
| 3,775,898 | 12/1973 | Kaliah . |
| 3,834,066 | 9/1974 | Vargas . |
| 3,913,260 | 10/1975 | Corbett . |
| 3,925,923 | 12/1975 | La Fata et al. . |
| 4,044,496 | 8/1977 | Jernstrom . |
| 4,125,959 | 11/1978 | Markiw . |
| 4,133,138 | 1/1979 | Coons . |
| 4,249,339 | 2/1981 | Crain et al. . |
| 4,276,713 | 7/1981 | Crosbie . |
| 4,299,049 | 11/1981 | Pimentel et al. . |
| 4,367,608 | 1/1983 | Melotti . |

(List continued on next page.)

FOREIGN PATENT DOCUMENTS

| 542579 | 6/1957 | (CA) . |
|---|---|---|
| 589917 | 9/1897 | (GB) . |

Primary Examiner—David H. Bollinger
(74) Attorney, Agent, or Firm—Marshall, O'Toole, Gerstein, Murray & Borun

(57) ABSTRACT

A candy dispenser in the form of a toy spacecraft having a single user action dispensing mechanism is provided. The candy dispenser may include an internal cavity to store candies. The internal cavity may be provided in the form of a cockpit for the spacecraft, with a cockpit windshield serving as a lid to retain candies therein. The dispensing mechanism may include a user-depressable button in the form of a passenger of the spacecraft, which upon a single depression, both loads a candy into a firing chamber, and fires the candy from the spacecraft. After each depression of the passenger button, the button is automatically reset to facilitate ease of use and rapid firing.

20 Claims, 6 Drawing Sheets

U.S. PATENT DOCUMENTS

| | | |
|---|---|---|
| 4,481,731 | 11/1984 | La Fata et al. . |
| 4,556,392 | 12/1985 | Chang . |
| 4,576,582 | 3/1986 | Panzarella . |
| 4,605,230 | 8/1986 | Halford et al. . |
| 4,735,594 * | 4/1988 | Miller ................................. 221/24 X |
| 4,764,141 | 8/1988 | D'Andrade . |
| 4,770,649 | 9/1988 | Cuccio . |
| 4,775,348 | 10/1988 | Collins . |
| 4,840,597 | 6/1989 | Perez . |
| 4,884,992 * | 12/1989 | Grimes ............................... 221/24 X |
| 4,955,840 | 9/1990 | Moomaw . |
| 5,078,636 | 1/1992 | Clarke et al. . |
| 5,156,564 | 10/1992 | Hasegawa . |
| 5,224,893 | 7/1993 | Routzong et al. . |
| 5,366,402 | 11/1994 | Rudell et al. . |
| 5,460,295 * | 10/1995 | Law ................................. 221/270 X |
| 5,462,469 | 10/1995 | Lei . |
| 5,478,267 | 12/1995 | McDonald et al. . |
| 5,520,564 | 5/1996 | DeMars . |
| 5,542,869 | 8/1996 | Petty . |
| 5,603,651 | 2/1997 | Shure et al. . |
| 5,613,890 | 3/1997 | DeMars . |
| 5,620,351 | 4/1997 | Ho . |
| 5,620,353 | 4/1997 | Lai . |
| 5,643,035 | 7/1997 | Freese et al. . |
| 5,651,475 * | 7/1997 | Fenton ................................. 221/24 |
| 5,695,379 | 12/1997 | Ho . |
| 5,704,821 | 1/1998 | Mann . |
| 5,722,383 * | 3/1998 | Tippmann, Sr. et al. .......... 221/24 X |
| 5,879,218 | 3/1999 | Tao . |
| 5,931,338 * | 8/1999 | Hoeting et al. ........................ 221/24 |

\* cited by examiner

CANDY DISPENSER WITH SINGLE-USER-ACTION DISPENSING MECHANISM

BACKGROUND OF THE INVENTION

The present invention generally relates to toys and, more particularly, relates to candy dispensing toys.

Children have long enjoyed the entertainment value offered by candy dispensers. Not only are children typically excited by the end result of obtaining a piece of candy, but the mechanics of presenting and delivering the candy to the child is often equally exciting. Such candy dispensers can be provided in the form of well-known gum ball machines, often provided outside commercial establishments such as supermarkets and the like, wherein the gum ball machine typically includes visually captivating elements such as a large clear globe filled with brightly colored candies, and/or a spiral or labyrinthine pathway for delivering the candy.

Candy dispensers may also be provided in the hand-held or portable variety. Such dispensers are provided in a number of forms, with the most common being a toy gun of some sort which is adapted to fire a candy upon manipulation of a trigger. U.S. Pat. Nos. 2,631,578 and 2,921,573 provide two examples of toy candy dispenser guns. Similar dispensers may be provided in the form of toy animals, such as those disclosed in U.S. Pat. Nos. 3,360,930 and 5,651,475.

While such devices attempt to provide visually and audibly stimulating toys to captivate the interest of children, it is important to understand that the attention span of children is often limited. Complicated and multiply sequenced steps for dispensing a candy can often require time beyond the patience of the child. Moreover, complicated mechanical structures requiring multiple steps such as a toy gun requiring, among other things, a first step of cocking a firing mechanism and a second step of triggering the release of the firing mechanism can lend themselves to mechanical malfunction, fatigue, or failure. This, in turn, can upset the child, or the parent, ultimately leading to the child stopping usage of the toy.

SUMMARY OF THE INVENTION

In accordance with one aspect of the invention, a candy dispenser is provided which may include a candy hopper, an opening, an actuating mechanism, and a trigger mechanism. The candy hopper may include a bottom aperture with the opneing being disposed below the bottom aperture of the hopper. The actuating mechanism may be disposed in the opening and be adapted to move between a firing position at least partially closing the aperture, and a loading position opening the aperture. The trigger mechanism may be connected to the actuating mechanism, with a single actuation of the trigger mechanism moving the actuating mechanism from the firing position to the loading position, and back to the firing position. A piece of candy falls into the opening through the aperture when the actuating mechanism is moved from the firing position to the loading position, and the piece of candy is forcibly ejected from the dispenser when the actuating mechanism moves form the loading position to the firing position.

In accordance with another aspect of the invention, such a candy dispenser may be provided wherein the trigger mechanism includes a pivotable plate, an actuation rod connected to the pivotable plate, a drag arm connected to the pivotable plate, and a spring biasing the actuating mechanism toward the firing position. Depression of the actuation rod may rotate the pivotable plate, which in turn pulls the drag arm and drags the actuating mechanism to the loading position. Upon further depression of the actuation rod, the drag bar disengages from the actuation mechanism, and allows the spring to force the actuating mechanism toward the firing position, thus dispensing a candy.

In accordance with another aspect of the invention, a candy dispenser in the shape of a spacecraft is provided which may include an internal candy reservoir adapted to retain a plurality of candy pieces, and an actuating mechanism that loads and forcibly ejects candy pieces from the dispenser based on a single user action. The forcible ejection of the candies simulates a weapon being fired from the spacecraft.

In accordance with another aspect of the invention, a toy spacecraft adapted to dispense objects is provided which may include a simulated fuselage, a simulated cockpit, and a simulated passenger mechanism. The simulated fuselage may have a base, with an object dispensing chute being provided in the base of the fuselage. The simulated cockpit may be adapted to store a plurality of objects, with the cockpit being in communication with the dispensing chute. A single depression of the simulated passenger mechanism may cause an object to be fired from the toy spacecraft and another object to be communicated from the cockpit to the dispensing chute. The object dispensed by the toy spacecraft may be in the form of candies.

In accordance with yet another aspect of the invention, a method of dispensing candies is provided which may comprise the steps of providing a toy spacecraft having at least one appendage, and depressing the appendage to cause a candy to be forcibly ejected from the spacecraft. The forcible ejection simulates a weapon being fired from the spacecraft.

The features and advantages of the present invention will be apparent to those of ordinary skill in the art in view of the following detailed description of the preferred embodiments, which is made with reference to the drawings, a brief description of which is provided below.

DETAILED DESCRIPTION OF THE PREFERRED EMBODIMENTS

Figure 1:
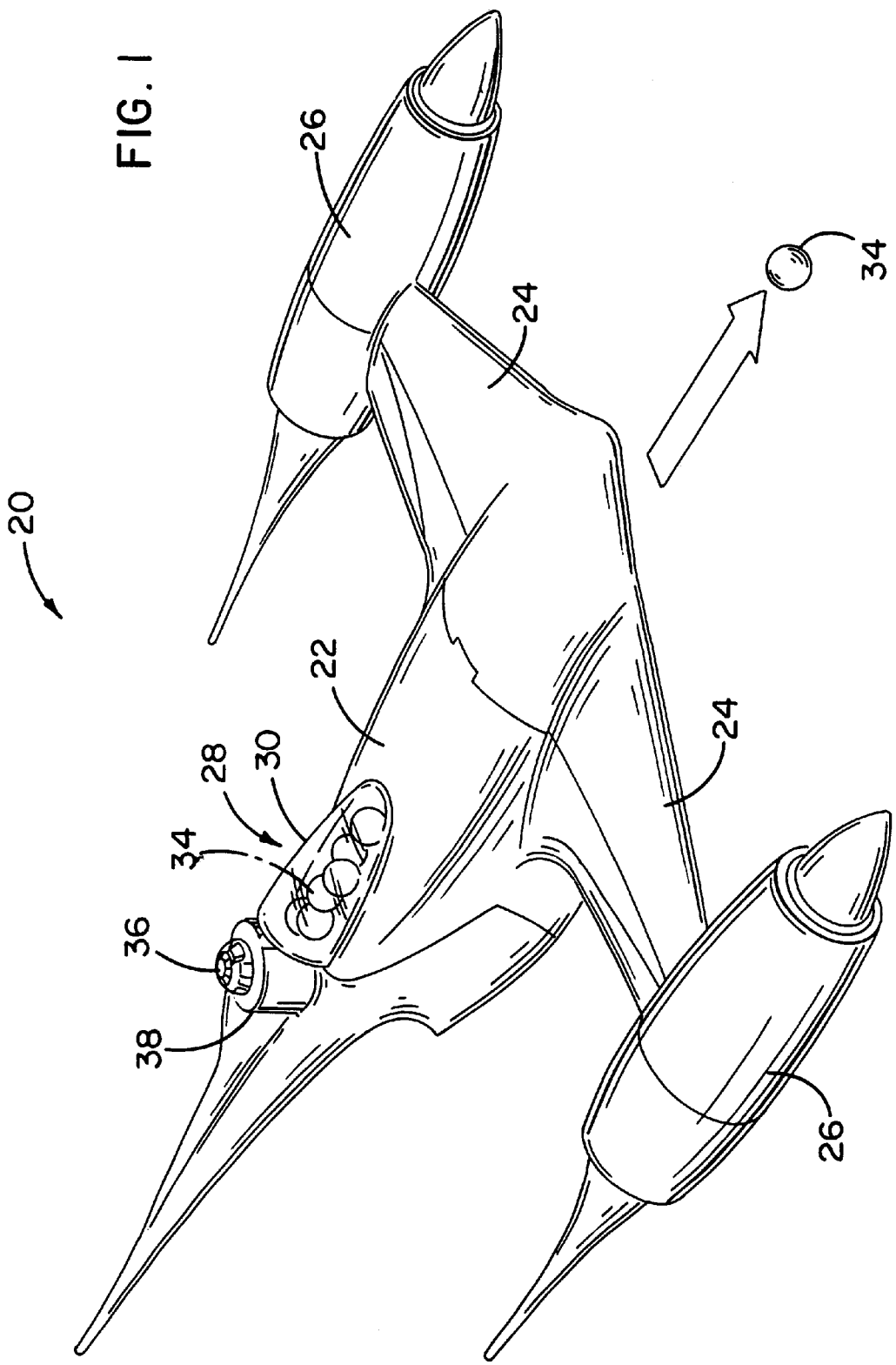
FIG. 1 is a perspective view of a toy candy dispensing spacecraft built in accordance with the present invention.

Referring now to the drawings, and with specific reference to FIG. 1, a candy dispenser built in accordance with the present invention is generally depicted by reference numeral 20. While the dispenser 20 is depicted as a toy spacecraft, it is to be understood that the dispenser can take the form of many other objects other than spacecrafts.

As shown in FIG. 1, the dispenser 20 may include a fuselage 22, wings 24, and propulsion engines 26. Such simulated elements are all preferably manufactured from plastic and are brightly colored to capture the attention of children.

The fuselage 22 may include a cockpit 28 having an operable windshield 30 adapted to open and close to allow access to the cockpit 28. The cockpit 28 is in communication with a reservoir 32 (FIG. 2) adapted to retain a plurality of candies 34. The windshield 30 may be mounted to the fuselage using a conventional frictional hinge mechanism 35.

Shown directly behind the cockpit 28 is a simulated passenger 36 provided in a cylindrical seat 38. In the depicted embodiment, the passenger 36 is in the form of the well-known robotic character "R2 D2" from the motion picture STAR WARS, but other passenger forms, and spacecraft forms, can certainly be employed. Upon depression of the passenger 36, one of the plurality of candies 34 is loaded into a firing position, and forcibly ejected from the dispenser 20 by a firing mechanism 39.

Figure 6:
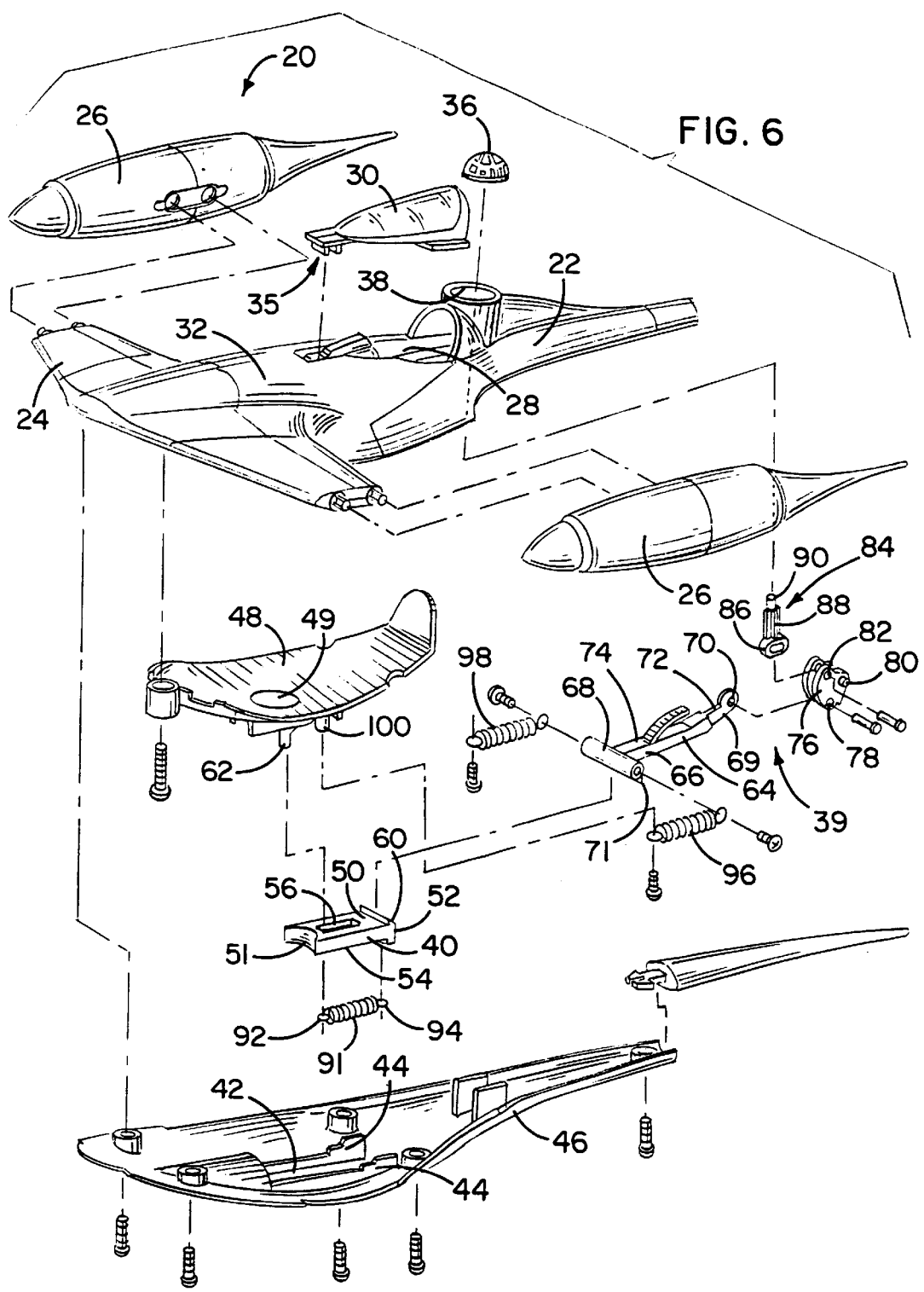
FIG. 6 is an exploded view of the toy candy dispensing spacecraft.

As shown in FIGS. 2–5, the firing mechanism 39 may include a hammer 40 slidably disposed within a firing chamber or chute 42. The chute 42 is defined by a pair of raised walls 44 extending from a base 46 positioned below the hammer 40 (see FIG. 6). A reservoir or hopper tray 48 is positioned above the hammer 40 and cooperates with the raised walls 44 and base 46 to define the chute 42. The hopper tray 48 may include an aperture 49 adapted to communicate candies 34 from the reservoir 32 to the chute 42.

The hammer 40 includes a top surface 50, a front end 51, a rear end 52, a recessed bottom surface 54, and an elongate slot 56. The front end 51 may include an arcuate recess 58, while the rear end 52 may include an extension lip 60 upwardly extending from the top surface 50. A leg 62 downwardly extends from the hopper tray 48 and into the elongate slot 56.

A drag arm 64 is positioned rearward of the hammer 40 and includes a front end 66 having an cross bar 68, and a rear end 69 having a connection pivot 70. An engagement lip 71 extends from the cross bar 68. The drag arm 64 includes a canted section 72 angled with respect to a main section 74.

The drag arm 64 is pivotally connected to a pivot plate 76. More specifically, the pivot plate 76 includes a first pivot point 78 connected to the connection pivot 70 of the drag arm 64. The pivot plate 76 includes stubs 80 which pivotally connect the pivot plate 76 to the base 46. The pivot plate 76 further includes a second pivot point 82 connected to an actuation rod 84. The actuation rod 84 includes a connection pivot 86 connected to the second pivot point 82, a main member 88, and a connection pin 90. The actuation rod 84 is adapted to reciprocated with the cylindrical seat 38, with the passenger 36 being mounted onto the connection pin 90.

The firing mechanism 39 may be spring biased and in the depicted embodiment includes an extension spring 91 positioned within the recessed bottom 54 of the hammer 40. The spring 91 may include a first end 92 connected to the leg 62, and a second end 94 connected to the rear end 52 of the hammer 40. First and second return springs 96, 98 may be connected between the drag arm 64 and first and second posts 100 downwardly extending from the hopper tray 48.

FIGS. 2–5 show fragmentary cross-sectional views of the fuselage 22 and the firing mechanism 39 at various stages of operation. With initial reference to FIG. 2, the firing mechanism 39 is shown in a rest position. In such a position, a hammer 40 is disposed forwardly within the firing chamber 42. In so doing, the aperture 49, adapted to communicate the candies 34 from the reservoir 32 to the firing chamber 42 is blocked by the top surface 50 of the hammer 40. But for the top surface 50 of the hammer 40, gravity would allow the candy 34 to fall from the reservoir 32 to the firing chamber 42. The hammer 40 is retractable into a second or loading position shown in FIG. 4 by depression of the passenger 36.

Figure 2:
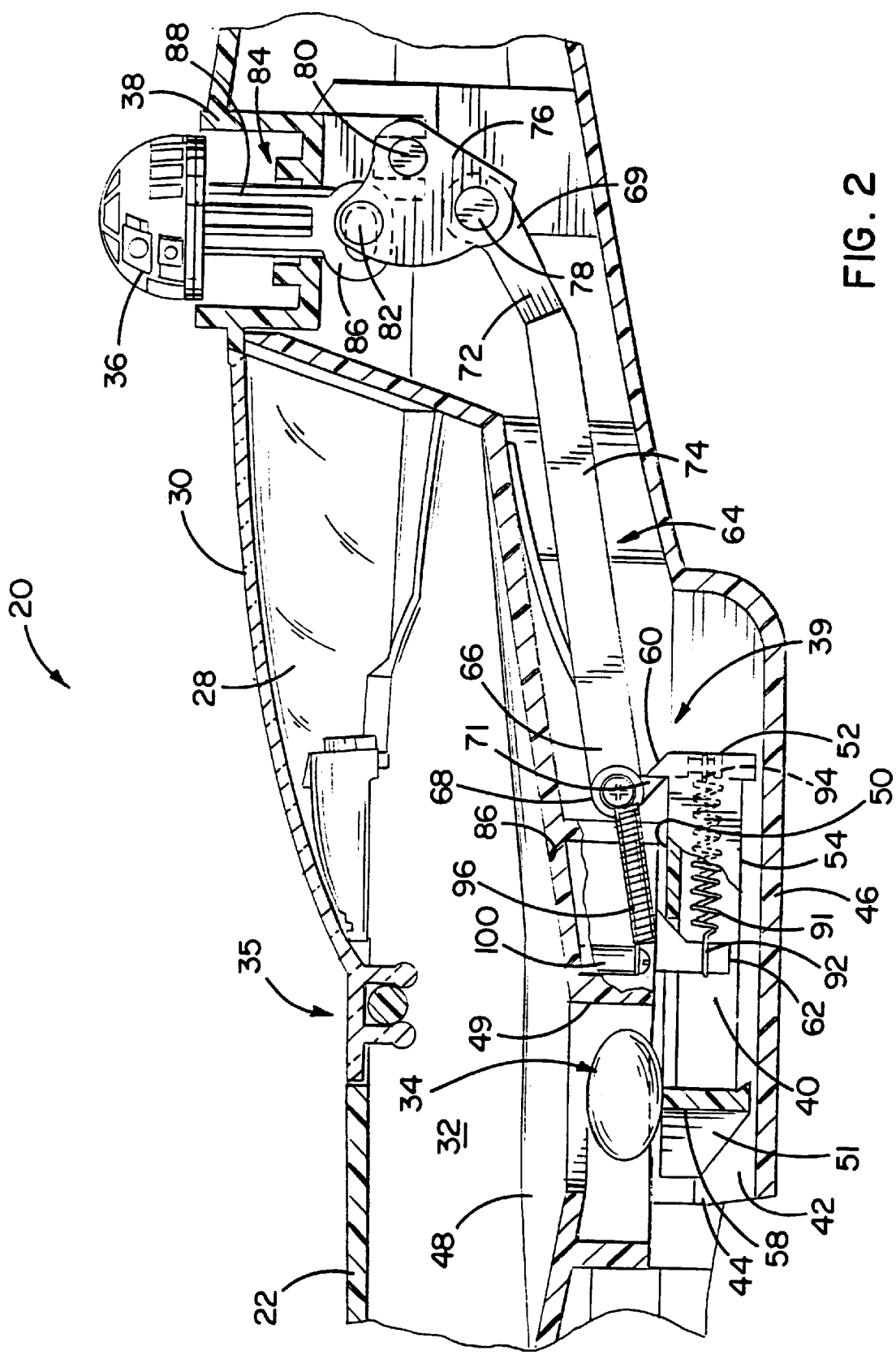
FIG. 2 is a fragmentary cross-sectional view of the firing mechanism in a rest position.
Figure 3:
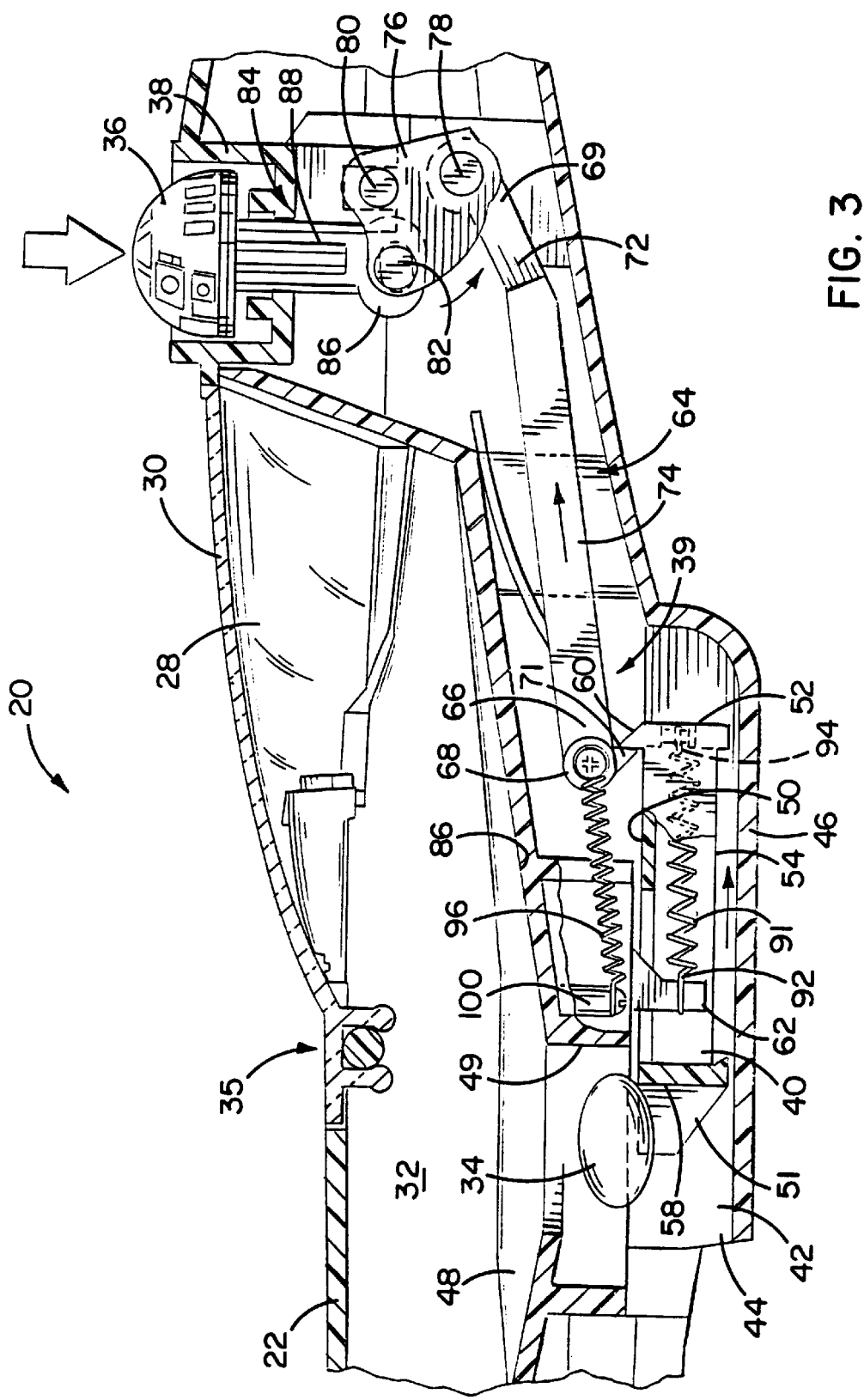
FIG. 3 is a fragmentary cross-sectional view of the firing mechanism in an initially depressed position.

As shown in FIG. 3, upon initial depression of the passenger 36, the hammer 40 begins to retract within the firing chamber 42. More specifically, depression of the passenger 36 causes depression of the actuation rod 84, which is pivotally attached to the pivot plate 76 at the second pivot point 82. In the depicted embodiment, the pivot plate 76 begins to rotate counterclockwise upon depression of the passenger 36, which in turn causes rearward retraction of the drag arm 64, pivotally attached to the pivot plate 76 at the first pivot point 78. Rearward retraction of the drag arm 64 causes the engagement lip 71 of the drag arm 64 to engage the extension lip 60 provided on the top surface 50 of the hammer 40. Accordingly, the hammer 40 is rearwardly retracted (to the right in FIGS. 2–5) when the drag arm 64 is rearwardly retracted.

Figure 4:
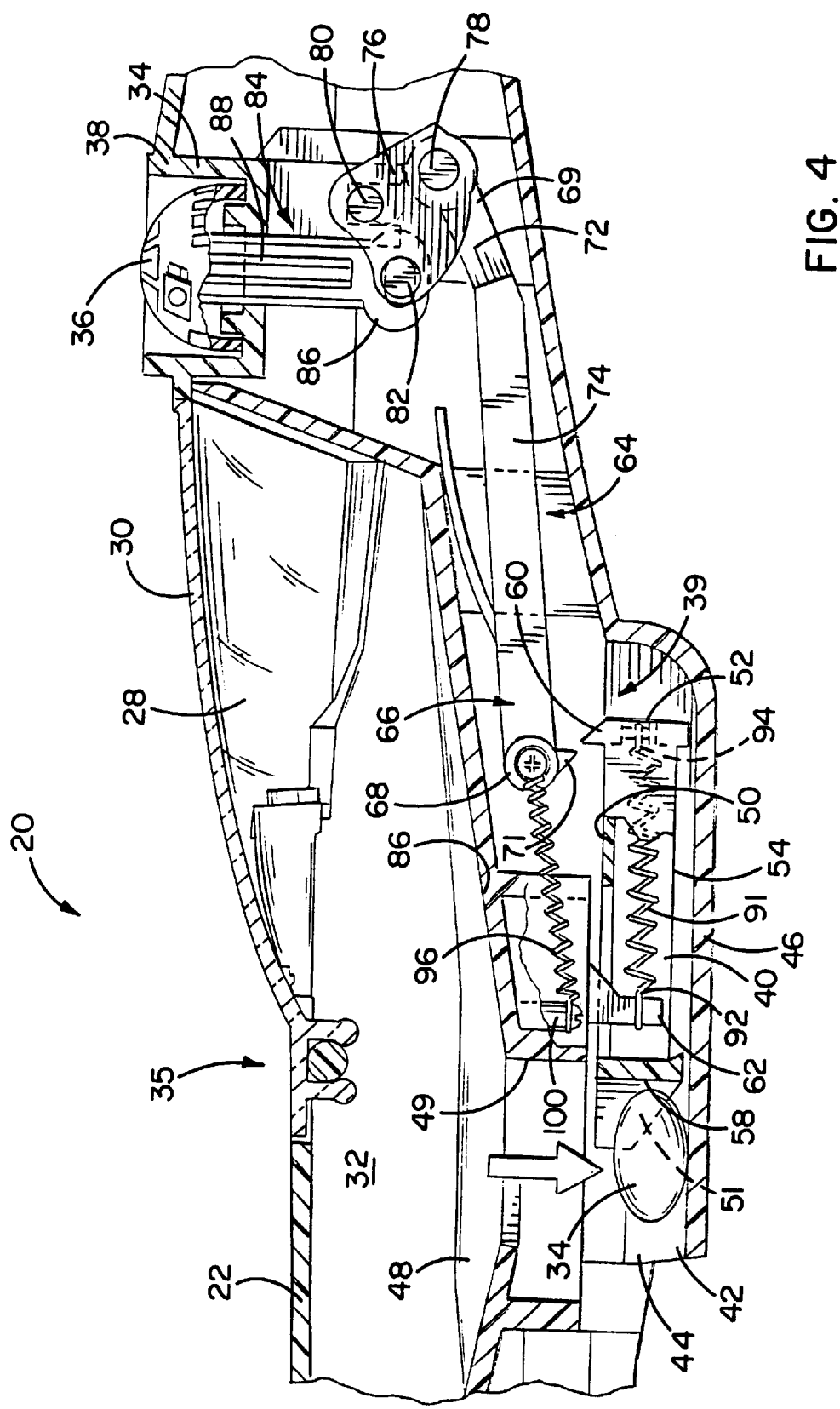
FIG. 4 is a fragmentary cross-sectional view of the firing mechanism in a fully depressed and loading position.
Figure 5:
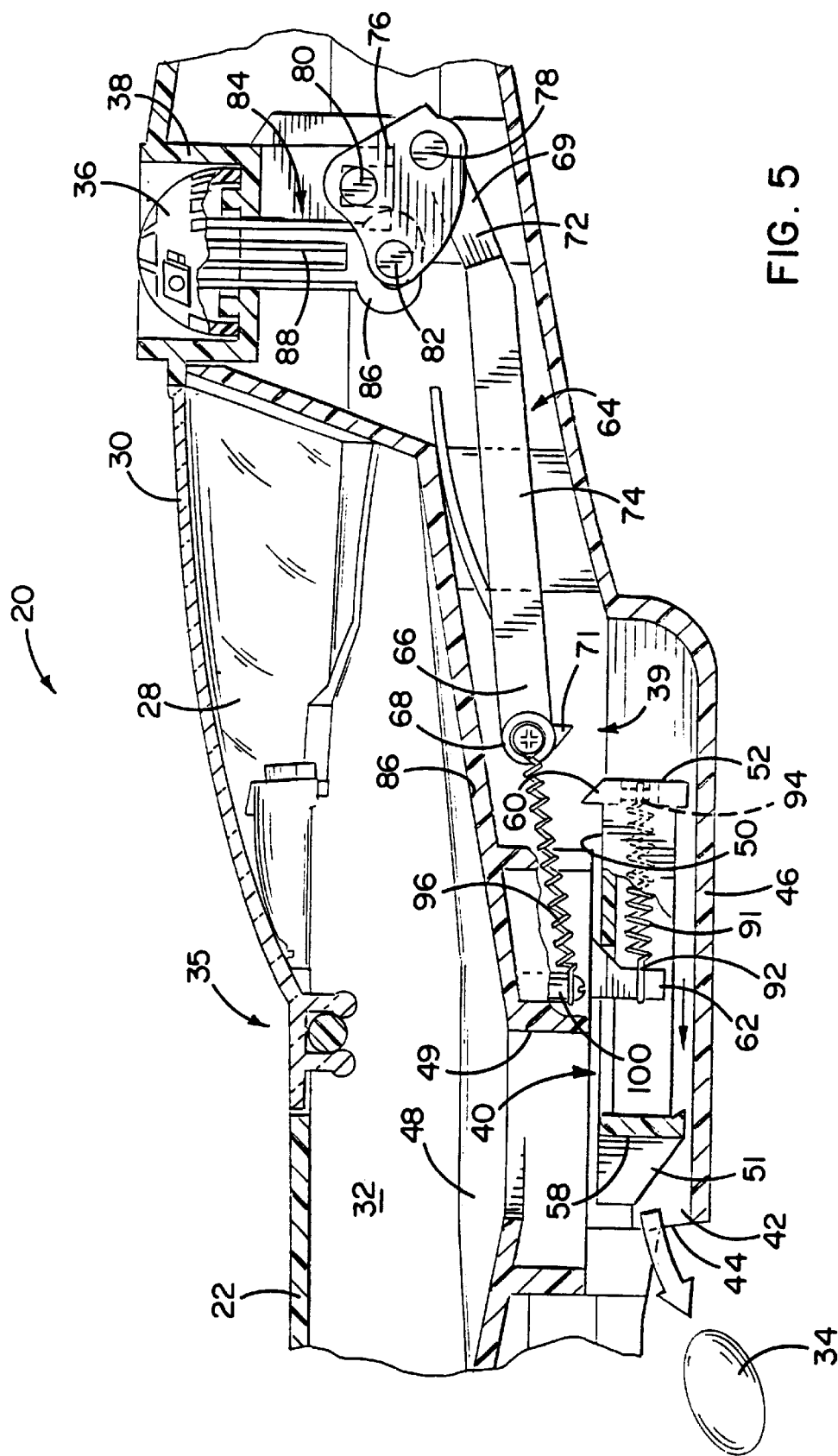
FIG. 5 is a fragmentary cross-sectional view of the firing mechanism in a released and firing position.

Given the geometry of the pivot plate 76, and the canted shape of a rear end 69 of the drag arm 64, upon further depression of the passenger 36, the drag arm 64 is lifted vertically as shown in FIG. 4. In so doing, the engagement lip 71 disengages from the extension lip 60. Consequently, when the hammer 40 is rearwardly retracted, it is retracted against the biasing force of the extension spring 91. As the hammer 40 is rearwardly retracted, the spring 91 is extended such that upon release of the engagement lip 69 from the extension lip 60, the spring 91 causes the hammer 40 to fire forwardly within the firing chamber 42.

Returning again to FIG. 4, it will be noted that immediately prior to release of the engagement lip 71 from the extension lip 60, the front end 51 of the hammer 40 is rearwardly retracted sufficiently so that the hammer 40 no longer blocks the aperture 49, and thus allows a piece of candy 34 to fall from the reservoir 32 into the firing chamber 42. To facilitate this action, it will be noted from FIG. 6 that the front end 51 of the hammer 40 is provided with an arcuate recess 58 provided both to cup the candies 34 and lessen the length of travel required by the hammer 40 to allow a single piece of candy 34 to be loaded into the firing chamber 42.

Upon release of the engagement lip 71 from the extension lip 60, the spring 91, which is under tension, recoils, which in turn imparts force to the hammer 40, driving the hammer 40 forwardly through the firing chamber 42. This action imparts force to the candy 34 to eject the candy 34 from the dispenser 20. Since the dispenser is preferably in the shape of a spacecraft, such ejection of the candy 34 simulates a weapon being fired form the spacecraft.

In order to return the passenger 36 to an upright or reset position such as that shown in FIG. 2, after release of the engagement lip 71 from the extension lip 60, and the release of a user's thumb from the passenger 36, the return springs 96, 98, which had been stretched into tension due to rearward retraction of the drag arm 64, are allowed to recoil. This action pulls the drag arm 64 forwardly, rotates the pivot plate 76, upwardly directs the actuation rod 84, and returns the passenger 36 to an outward position relative to the fuselage 22. This position is again the rest position depicted in FIG. 2.

Therefore, it will readily be appreciated that the user of the dispenser 20 is only required to make a single depression of the passenger 36 to both load a candy 34 into the firing chamber 42, and fire the candy 34 from the dispenser 20. In so doing, the passenger 36 is automatically returned to a reset position for subsequent uses, and rapid firing.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A candy dispenser, comprising:
   a candy hopper having a bottom aperture;
   an opening disposed below the bottom aperture of the hopper;
   an actuating mechanism disposed in the opening and adapted to move between a firing position at least partially closing the aperture, and a loading position opening the aperture; and
   a trigger mechanism connected to the actuating mechanism, a single actuation of the trigger mechanism moving the actuating mechanism from the firing position to the loading position and back to the firing position;
   wherein a piece of candy from the candy hopper falls into the opening through the aperture when the actuating mechanism is moved from the firing position to the loading position, and the piece of candy is forcibly ejected from the dispenser when the actuating mechanism moves from the loading position to the firing position.

2. The candy dispenser of claim 1 wherein the trigger mechanism includes a pivot plate, an actuation rod connected to the pivot plate and including an engagement lip adapted to engage the actuating mechanism, and a spring biasing the actuating mechanism toward the firing position, depression of the actuation rod rotating the pivot plate, rotation of the pivot plate dragging the actuating mechanism to the loading position, the drag bar disengaging from the actuating mechanism when the actuating mechanism reaches the loading position, the actuating mechanism being forced into the firing position by the spring when the drag bar disengages.

3. The candy dispenser of claim 2 further including a second spring biasing the actuation rod into an upward position.

4. The candy dispenser of claim 1 further including a housing in the shape of a toy spacecraft, the trigger mechanism including an actuation button at an end of the actuation rod in the shape of a passenger of the toy spacecraft.

5. The candy dispenser of claim 4 wherein the toy spacecraft housing includes a cockpit lid, the cockpit lid being operable to allow candy to be loaded into the candy hopper.

6. A candy dispenser in the shape of a simulated spacecraft, comprising:
   an internal candy reservoir adapted to retain a plurality of candy pieces; and
   an actuation mechanism that loads and forcibly ejects candy pieces from the dispenser based on a single user action, the forcible ejection of the candy pieces simulating a weapon being fired from the spacecraft.

7. The candy dispenser of claim 6 wherein the actuating mechanism includes a firing chamber and the internal candy reservoir includes an aperture in periodic communication with the firing chamber.

8. The candy dispenser of claim 7 wherein the actuating mechanism further includes a hammer disposed in the firing chamber, the hammer adapted to move from a loading position wherein the aperture of the candy reservoir is in communication with the firing chamber, and a firing position wherein the aperture is not in communication with the firing chamber, one of the candy pieces being moved from the reservoir to the firing chamber when the hammer is in the loading position, the candy piece being fired from the candy dispenser when the hammer moves from the loading position to the firing position.

9. The candy dispenser of claim 8 wherein the actuating mechanism includes a drag arm releasably attached to the hammer, a cam ring pivotably attached to the drag arm, an actuation rod pivotably attached to the cam ring, and a spring engaging the hammer and biasing the hammer into the firing position.

10. The candy dispenser of claim 9 further including a second spring connected to the drag arm to reset the drag arm, pivot plate and actuation rod.

11. A toy spacecraft adapted to dispense objects, the toy spacecraft comprising:
    a simulated fuselage having an object dispensing chute;
    a simulated cockpit, the cockpit adapted to store a plurality of objects, the cockpit being in communication with the dispensing chute; and
    a simulated passenger mechanism seated in the fuselage, a single depression of the simulated passenger mechanism causing an object to be fired from the toy spacecraft and another object to be communicated from the cockpit to the dispensing chute.

12. The toy spacecraft of claim 11 wherein the simulated passenger mechanism includes a firing mechanism attached to a simulated passenger and contained with the fuselage, the firing mechanism including a spring biased hammer adapted to impart force to an object upon depression of the simulated passenger.

13. The toy spacecraft of claim 12 wherein the firing mechanism further includes a releasable arm connecting the simulated passenger to the hammer, the releasable arm pulling the hammer against the spring and compressing the spring when the passenger is depressed, the releasable arm disengaging from the hammer when the passenger is fully depressed, the spring pushing the hammer forward against an object when the releasable arm is disengaged.

14. The toy spacecraft of claim 13 further including a second spring proximate the passenger and biasing the passenger into an outward position relative to the fuselage.

15. The toy spacecraft of claim 11 wherein the cockpit further includes an operable windshield allowing access for loading objects into the cockpit.

16. The toy spacecraft of claim 11 wherein the objects are candies.

17. A method of dispensing candies comprising the steps of:
    providing a toy spacecraft having at least one appendage;
    depressing the appendage once and in a single direction to cause a candy to be forcibly ejected from the spacecraft, the forcible ejection simulating the firing of a weapon from the spacecraft.

18. The method of claim 17 wherein the appendage is a passenger of the spacecraft, and the depressing step includes the step of depressing the passenger.

19. The method of claim 17 wherein the depressing step automatically loads a candy into a dispensing position before dispensing.

20. The method of claim 19 further including the step of resetting the passenger to an outward position relative to the spacecraft.

* * * * *